United States Patent [19]
Gonsior

[11] Patent Number: 4,930,748
[45] Date of Patent: Jun. 5, 1990

[54] SHUTOFF AND REGULATING VALVE

[75] Inventor: Wolfgang Gonsior, Lindau-Bodolz, Fed. Rep. of Germany

[73] Assignee: Xomox International GmbH & Co., Lindau, Fed. Rep. of Germany

[21] Appl. No.: 384,207

[22] Filed: Jul. 24, 1989

[30] Foreign Application Priority Data

Jul. 23, 1988 [DE] Fed. Rep. of Germany ....... 3825116

[51] Int. Cl.$^5$ .............................................. F16K 5/02
[52] U.S. Cl. .................... 251/163; 251/214; 251/312
[58] Field of Search ............... 251/161, 162, 163, 188, 251/214, 309, 312; 137/312

[56] References Cited

U.S. PATENT DOCUMENTS

| | | | |
|---|---|---|---|
| 1,741,983 | 12/1929 | Ellberg et al. | 251/312 X |
| 4,101,113 | 7/1978 | Plessing | 251/214 |
| 4,111,392 | 9/1978 | Edelmann | 251/214 |
| 4,126,295 | 11/1978 | Natalizia | 251/315 |
| 4,235,418 | 11/1980 | Natalizia | 251/359 |
| 4,475,712 | 10/1984 | Defoger | 251/214 |
| 4,640,305 | 2/1987 | Johnson | 137/312 |

FOREIGN PATENT DOCUMENTS 204650 12/1986 European Pat. Off. .
2742115 12/1987 Fed. Rep. of Germany .
2316506 1/1977 France .

Primary Examiner—John C. Fox
Attorney, Agent, or Firm—Foley & Lardner, Schwartz, Jeffery, Schwaab, Mack, Blumenthal & Evans

[57] ABSTRACT

A shutoff and regulating valve contains, in a housing (2), a shutoff element which is designed especially as a stopcock (8) and which is arranged to be rotatable by means of a stem (26). The stem (26) is guided outward through a housing cover (20), a first sealing element (50) being provided for sealing purposes. The valve is designed for a minimized leakage rate and high safety requirements. The first sealing element (50) is supported on the underside of the housing cover (20) by an annular disk (54), and a second sealing element (60) is arranged on the upper side of the cover (20), so as to be adjustable, particularly by means of an axially movable bush (62).

15 Claims, 2 Drawing Sheets

SHUTOFF AND REGULATING VALVE

The present invention relates to a shutoff and regulating valve with a shutoff element designed as a stopcock, a housing in which the shutoff element is arranged rotatably by means of a stem, a housing cover through which the stem extends outwardly so as to be sealed off by means of a first sealing element, and a second sealing element arranged on the surface of the cover.

BACKGROUND OF THE INVENTION

West German Patent No. DE 2,742,115 discloses a shutoff and regulating valve of this type, the stem of which is sealed off by means of two sealing elements arranged in the housing cover. The cover has an annular groove on its underside into which the first sealing element is inserted. Arranged between the stem and the stopcock is an intermediate piece having a T-shaped cross section which engages into a square recess of the stopcock. This intermediate connecting piece, on its upper side facing the stem, has a larger diameter than the stem. The first sealing element rests on the upper side of the connecting piece, and the sealing effect of the first sealing element is dependent on the axial position of the connecting piece and/or of the stem. Since the axial position of the stem varies as a result of production tolerances, abrasion, external forces and the like, difficulties can arise with regard to safety regulations and environmental protection regulations, in ensuring that the requisite limiting values for leakage rates can be maintained even throughout a long lifetime. If the shutoff element is adjustable in the direction of the stem axis, particularly if the stopcock is of conical design, additional difficulties can arise. The conical sealing faces of the stopcock interact with a bush which is appropriately pressed into the housing and which is normally composed of polytetrafluoro-ethylene (PTFE) or a comparable material. During assembly, the stopcock has to be adjusted in the direction of the stem axis, in order to assure a sealing contact. In previously known constructions, during this adjustment, stress was also exerted on the first sealing element of the stem, and in practice an excessive pressing of the first sealing element against the stem was often found. This resulted in excessive wear of the first sealing element, with the result of an appreciably reduced lifetime and a diminished sealing effect.

SUMMARY OF THE INVENTION

It is therefore the object of the present invention to provide a shutoff and regulating valve of the aforementioned type which can be produced at low cost.

It is also an object of the present invention to provide a shutoff and regulating valve which minimizes leakage rates and satisfies strict safety requirements.

Another object of the invention is to provide a shutoff and regulating valve in which, after an unacceptable leakage flow has occurred and been detected, an additional sealing can take place, so that the shutoff valve does not have to be replaced immediately, but only after a predetermined time, e.g. during the next routine shutdown of the apparatus.

Yet another object of the invention is to provide a shutoff and regulating valve which has a high functional reliability and a long service lifetime, and which facilitates simple exchange and replacement of damaged components.

These and other objects of the invention are achieved by providing a shutoff and regulating valve with a shutoff element designed especially as a stopcock, with a housing in which the shutoff element is arranged rotatably by means of a stem, and with a housing cover, through which the stem is guided outward so as to be sealed off by means of a first sealing element, a second sealing element being arranged on the surface of the cover, wherein the first sealing element is supported on the underside of the cover on an annular disk.

The proposed shutoff and regulating valve has a simple and nevertheless functionally reliable design. Because the first sealing element is supported independently of the instantaneous axial position of the stem or of the shutoff element, to that extent they are prevented from influencing one another, so that the first sealing element exerts the sealing effect as effectively as possible. Because the first sealing element is supported by means of the annular disk, specific relationships are provided for the first sealing element independently of the depth of adjustment of the stopcock in the housing. This brings about reproducible conditions both for the sealing ring of the stopcock in relation to the housing and in terms of the first sealing element for the stem, so that a reliable sealing is assured at a low production cost and with a small structural volume. By means of the second preferably readjustable sealing element, it is possible at a minimum production cost, after an unacceptable leakage flow has been detected, to prevent this for a predetermined period of time. The sealing element performs virtually no sealing function in the normal operating state or state of adjustment. The second sealing element is assigned a readjusting device which, when required, is actuated in such a way that these additional sealing means can exert their sealing effect. It should be stated, here, that the primary sealing elements rest against the stem in a way known per se and thus ensure sealing relative to the outside. As a result of the mechanical contact of the primary sealing element with the stem, this sealing element, which usually is composed of an elastomeric material, experiences wear dependent particularly on the number of stem actuations.

In an especially advantageous embodiment, the shutoff element designed as a stopcock is adjustable relative to the stem in the direction of the longitudinal axis of the housing and therefore in the flow direction. Because of this adjustability, the stem is substantially isolated from forces caused by the flow. The result of this is that, even during normal operation, the primary sealing elements of the stem are less subject to stress. In particular, the result of subjecting the stem to force via the stopcock is that a higher bearing force is exerted between the primary sealing element and the stem, primarily, in the flow direction than in other directions, with the result that greater wear takes place at the primary sealing element. These disadvantages are avoided in a simple way by the two-part design of the stem and stopcock and the movability of the latter relative to the stem.

BRIEF DESCRIPTION OF THE DRAWINGS

The invention will be explained in further detail below with reference to the illustrative embodiments shown in the accompanying drawings, wherein.

DETAILED DESCRIPTION OF PREFERRED EMBODIMENT

Figure 1:
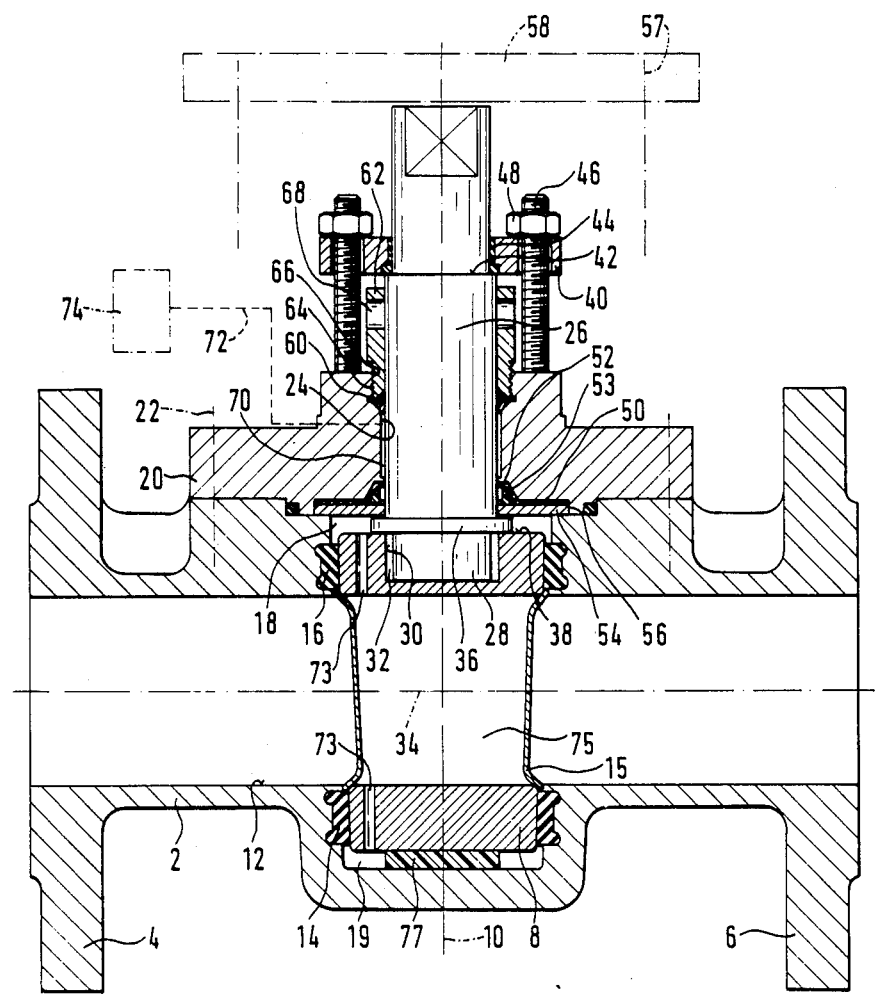
FIG. 1 shows a longitudinal section through a shutoff and regulating valve, in which both the stopcock and the second sealing element are adjustable with respect to the stem.

FIG. 1 shows, in an axial plane, a section through a housing 2 with flanges 4, 6 which are arranged at the axial ends and by means of which the connection to a pipeline system can be made in the usual way. In the housing 2, a stopcock 8 is rotatable about an axis 10 in order to open or shut off a channel 12 which extends throughout the housing 2. To seal the stopcock 8 relative to the housing, a bush 15 with a lower sealing strip 14 and an upper sealing strip 16 is pressed into the housing. The housing 2 has an orifice 18 which is closed off by means of a cover 20. As indicated by the broken lines 22, the cover 20 is connected firmly to the housing 2 and in the center contains a bore 24, through which a stem 26 is guided. In contrast to the previously known stopcock valves, according to the present invention, the stopcock 8 and the stem 26 are designed as separate parts, the stem 26 engaging at its end 28 in a recess 30 in the stopcock 8. It is essential, here, that the end 28, which is formed, for example, as a square engages in the recess 30 with play, as indicated by the gap 32. This ensures that the stopcock 8 will be decoupled from the stem 26, so that the stem is substantially isolated from forces exerted on the stopcock 8 by the flowing medium. The stopcock 8 is supported virtually exclusive of the bush 15 by means of the sealing strips 14, 16 in the direction of the longitudinal axis 34, that is to say orthogonally relative to the stem axis 10. The sealing elements, which are explained further below, provided for sealing the stem are consequently subjected to less stress, and in particular locally excessive surface pressures and therefore increased wear are avoided in a simple way.

Stopcock 8 rests with conical sealing faces against the PTFE bush 15 with sealing strips 14, 16. The stopcock is adjustable or settable in the direction of the axis 10, in order to ensure good sealing without excessively high surface pressures. For this purpose, the stem 26 has a collar 36 which rests against the end surface 38 of the stopcock 8. The stem 26 is biased relative to the cover 20, and therefore relative to the housing, in the direction of the axis 10 towards the stopcock 8 via mount 40. The mount 40 rests indirectly on an annular shoulder 42 of the stem 26 via an annular body 44 made of PTFE. The mount 40 is arranged on the cover 20 by means of screws 46 and can be adjusted in the direction of the stem axis 10 by rotating nuts 48.

The first sealing element for sealing the stem 26 relative to the cover 20 is a sealing ring 50 which rests against the stem 26 by means of a hook-shaped sealing lip 52. It is essential that the sealing ring, and particularly the sealing lip 52, be supported on an annular disk 54. The sealing ring 50 is therefore not supported axially, for example, by the annular collar 36 of the stem, and thereby achieves the same sealing effect independently of the axial adjustment of the stem or of the stopcock 8. The annular disk 54 and the sealing ring 50 are appropriately pressed into an annular groove 56 on the underside of the cover 20 in the manner of a stack and are connected firmly to the cover. This reliably prevents the primary sealing element or sealing ring 50 from coming loose inadvertently or even being "forgotten" in the course of assembly or during inspections.

According to the invention, the stem 26 has associated therewith a second sealing element which is designed as a sealing ring 60 and which is arranged readjustably on the upper end of the cover 20. For readjusting the sealing ring 60, which here has an approximately triangular cross section, a bush 62 is provided which is arranged in the bore 24 by means of an external thread 64 engaged with a corresponding internal thread on the upper cover edge. The bush 62 projects upwards beyond the cover 20 and contains recesses 68, into which a tool for rotating the bush 62 can be inserted. According to the invention, the second sealing element or sealing ring 60 is preadjusted by means of the bush 62 during normal operation in such a way that it does not achieve its full sealing effect. The sealing ring 60 therefore rests comparatively loosely against the stem 26, and there is virtually no appreciable wear or abrasion of the sealing ring 60, which is composed of an elastic sealing material, an elastomer or rubber. The actual sealing effect is predetermined by means of the first sealing element or the sealing ring 50. When the sealing effect of the sealing ring 50 decreases in the process of time, this is detected by the attendants. By tightening the bush 62, the sealing ring 60 can then be adjusted on the stem 26 in a way necessary to prevent an unacceptable escape of the medium along the stem for some time to come. The shutoff valve can still be used for a certain amount of time, without the pipeline system or a complex apparatus immediately having to be shut down entirely. The necessary repair or replacement, whether of the sealing elements, the stopcock or the entire shutoff valve, is then carried out during the next routine inspection work.

According to one preferred embodiment, an annular chamber 70 is provided for monitoring purposes axially between the two sealing rings 50, 60 and radially between the stem 26 and the inner wall of the bore 24 in the cover 20. As indicated by the dashed line 72, chamber 70 is connected via a passageway to an instrument 74 for monitoring leakage. With this instrument 74, it is possible, for example, to sense whether and to what extent the medium flowing in the channel 12 is escaping. This can be carried out especially electrically or pneumatically, whereby in the vicinity of the annular chamber 70 appropriate sensors are provided for sending corresponding signals to the instrument 74. Even with such leakage monitoring, it is basically sufficient during normal operation to ensure that the sealing ring 60 rests against the stem 26 with a low pressing force in order to achieve a minimum wear. Should the sealing ring 50 become leaky, the medium enters the annular chamber 70, and this fact is indicated by means of the instrument 74.

Furthermore, as indicated by the broken lines 57, a plate 58 or the like for fastening an actuating drive, not shown further here, is arranged above the cover by means of bolts. The stem 26 can be rotated about the axis 10 in the necessary way by means of the hydraulically, pneumatically or electrically operated actuating drive. It is essential, here, that, as represented by the lines 57, the actuating drive is connected directly to the cover 20, specifically independently of the connection of the cover to the housing as indicated by the lines 22. This results in an advantageous decoupling which is desirable not only in terms of the vibration behavior Also, an inadvertent loosening of the cover 20 during possible measures to mount the actuating drive can be prevented.

In one preferred embodiment, the stopcock 8 has bores 73 extending between the passage 75 and the spaces 18 and 19 located, respectively, above and below the stopcock 8. Spaces 18 and 19 are thus subjected to pressure or pressure-compensated. The end face of the stopcock 8 is larger in the upper space 18 than in the lower space 19. These faces of differing size produce a force component which acts axially on the stopcock and by means of which the stopcock 8 is pressed firmly into its seat, thereby achieving an increased radial sealing force. So that the stopcock 8 is prevented from being pressed too deeply into the bush 15, there is a bottom disk 77 in the lower space 19 which, in accordance with the invention, forms a stop and limits the downward travel of the stopcock 8.

Even when, in an alternative embodiment, there are no bores 73 leading to spaces 18 and 19, the bottom disk 77 still proves to be very important. In particular, if a leak occurs between the stopcock 8 and the bush 15 with sealing strips 14 and 16, the upper space 18 is subjected to pressure, with the result that the stopcock 8 is pressed into the seat. The resulting increased sealing force between the stopcock 8 and the bush 15 is usually sufficient to stop the leakage which has occurred. The bottom disk 77, although not being absolutely necessary under these circumstances, nevertheless has proved appropriate as an advantageous form of a stop. The bottom disk 77, which is inserted into the space 19 under the stopcock, is itself advantageously composed of PTFE or a comparable material.

Figure 2:
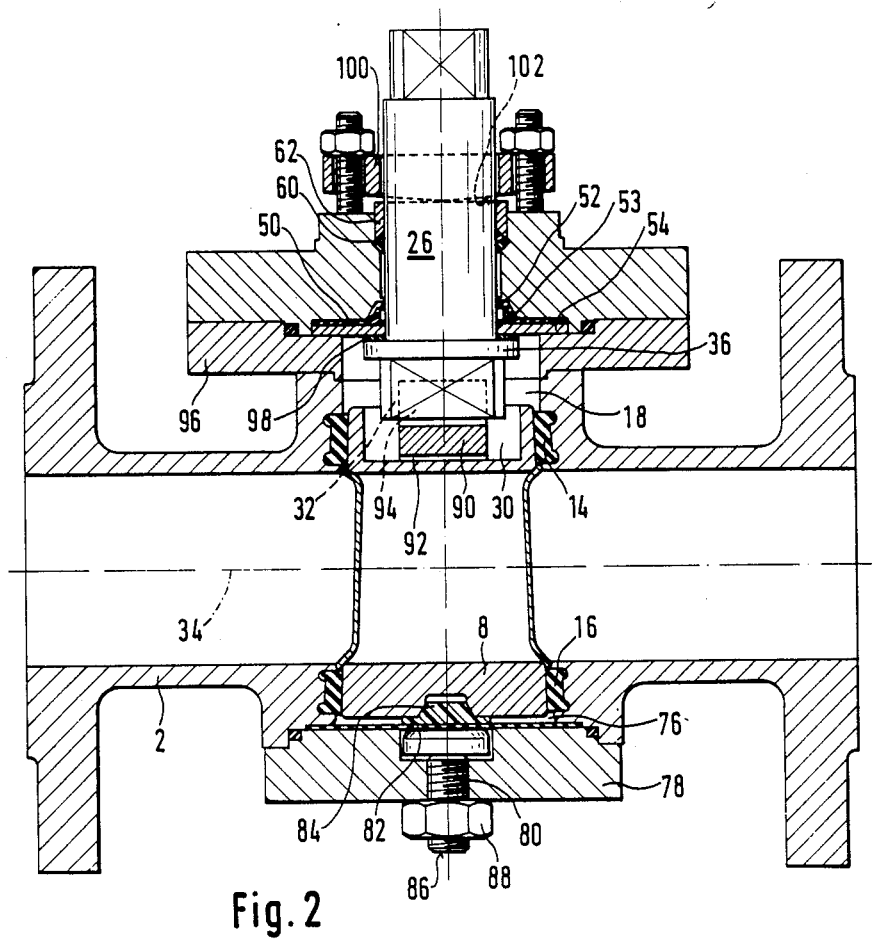
FIG. 2 shows an embodiment in which the second sealing element is adjustable with respect to the stem and the stopcock is adjustable with respect to the opposite side of the housing.

FIG. 2 illustrates a stopcock valve in which the adjustment of the stopcock 8 is effected on the opposite side of the housing 2 from the stem 26. Once again, the sealing faces of the stopcock 8 are conically formed with the cone apex on the same side as the stem 26 in relation to the longitudinal axis 34. The smaller sealing strip 14 of the bush 15 is now arranged in the space 18, while, as shown in the drawing, the larger sealing ring 16 is arranged on the underside of the housing in an opening 76, which is closed off sealingly by means of a cover 78. For the adjustment and setting of the stopcock 8, there is a threaded bolt 80 in the cover 78 which acts from below on the stopcock 8 via a sealing diaphragm 82 and a pressure body 84. The pressure body 84 is advantageously composed of a material having good sliding properties, particularly PTFE. The threaded bolt 80 has a recess, for example for a hexagon-socket wrench, at its lower end 86 and is held in place by means of the lock nut 88.

In this preferred embodiment according to the invention, the stopcock 8 also is movable relative to the stem 26 in such a way that, on the one hand, the stopcock is rotated by means of the stem and, on the other hand, the stopcock is decoupled from the stem with respect to forces exerted in the direction of the longitudinal axis 34. For this purpose, the stopcock 8 has a recess 30 in its end facing the stem 26, appropriately in the region sealed by means of the sealing ring 14. A connecting body 90 having an approximately T-shaped contour is inserted in this recess 30. The connecting body 90, with its lower part represented by broken lines here, engages in a groove 92 respectively in front of and behind the drawing plane and is movable with some play in this groove 92 perpendicularly relative to the drawing plane. The upper central part of the body 90 engages with play in a square recess 94 in the stem 26, the gap 32 once again being present in the direction of the longitudinal axis 34.

The stem 26 is again arranged rotatably in the cover 20, sealing being obtained by means of the first and second sealing elements or sealing rings 50, 60. In addition, an intermediate ring 96 is provided between the cover 20 and the housing 2 in order to axially secure both the annular disk or thrust ring 54 and the sealing ring 50. The annular disk 54 projects radially inward near to the outer circumference of the stem 26. This assures that the sealing ring 50 is supported and secured reliably, there being arranged within the hook-shaped sealing lip 52 a thrust ring 53 which is likewise mounted and supported reliably on the annular disk 54. It is essential, furthermore, that, in interaction with the annular collar 36, the stem 26 is also secured axially by means of the annular disk 54. The annular collar 36 has an outside diameter which is larger than the inside diameter of the annular disk 54. Advantageously, a ring 98 with good sliding properties, formed for example of PTFE, is arranged between the annular collar 36 and the annular disk 54, so that the stem 26 can be rotated by exerting only a small amount of force.

As already explained above, the sealing ring 60 is held in place by means of the axially adjustable bush 62. This purpose is served by a mount 100 which is arranged on the upper edge of the cover 20 and which rests with its lower edge 102 on the upper end face of the bush 62. As illustrated, the lower edge 102 is beveled slightly conically, so that, in practice, there are two bearing points on the bush 62. As a result of these bearing points or regions, which advantageously lie in a plane orthogonal relative to the longitudinal axis 34, an essentially centric force transmission is assured, thereby avoiding the danger of a canting or jamming of the bush 62.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A shutoff and regulating valve comprising a rotatable stem; a shutoff element in the form of a stopcock mounted on said stem to rotate therewith; a housing in which said shutoff element is arranged; a housing cover through which said stem extends; a first sealing element for sealing said stem where it extends through said housing cover; a second sealing element arranged on the surface of said cover, and an annular disk for supporting said first sealing element on the underside of said cover.

2. A shutoff and regulating valve as claimed in claim 1, wherein said annular disk is arranged in an annular groove on the underside of said cover.

3. A shutoff and regulating valve as claimed in claim 2, wherein said first sealing element is pressed into said annular groove together with said annular disk.

4. A shutoff and regulating valve as claimed in claim 1, wherein said first sealing element has a hook-shaped sealing lip which rests against said stem and is supported by a thrust ring on the inner edge of the annular disk.

5. A shutoff and regulating valve as claimed in claim 1, wherein said second sealing element rests loosely against said stem during normal operation, and further comprising an axially adjustable bush for selectively urging said second sealing element against said stem to produce a sealing effect when required.

6. A shutoff and regulating valve as claimed in claim 1, wherein said stem has an annular shoulder on which an axially adjustable mount acts through an annular body having good sliding properties.

7. A shutoff and regulating valve as claimed in claim 1, wherein said housing is provided with a bore opposite said stem, said bore is closed off by means of a cover, and an axially adjustable bolt is provided in said cover for adjusting said stopcock, said bolt acting on said stopcock through a pressure body.

8. A shutoff and regulating valve as claimed in claim 7, further comprising a sealing diaphragm interposed between said pressure body and said stopcock.

9. A shutoff and regulating valve as claimed in claim 1, wherein said stopcock is arranged to be movable with play relative to said stem in the direction of the longitudinal axis of said valve, and a predetermined gap is provided between said stem and said stopcock for determining the amount of play between the stem and the stopcock.

10. A shutoff and regulating valve as claimed in claim 1, wherein an annular chamber for leakage monitoring is provided surrounding said stem arranged axially between said first and second sealing elements.

11. A shutoff and regulating valve as claimed in claim 10, wherein said annular chamber is connected via a passageway to a leakage monitoring instrument.

12. A shutoff and regulating valve as claimed in claim 1, wherein said annular disk extends into the immediate vicinity of the outer wall of said stem; said stem has an annular collar arranged axially on the other side of said annular disk from said first sealing element, and said annular collar has an outside diameter which is larger than the inside diameter of said annular disk.

13. A shutoff and regulating valve as claimed in claim 1, wherein said stopcock is provided with a bore communicating between a passage extending through the stopcock and a space located adjacent said stopcock, and wherein said stopcock has end faces of differing size, whereby an axial force pressing said stopcock against said bush is produced.

14. A shutoff and regulating valve as claimed in claim 13, wherein said space is located above said passage.

15. A shutoff and regulating valve as claimed in claim 13, wherein said space is located below said passage.

* * * * *